T. A. MILUTIN.
AUTOMATIC SAFETY ATTACHMENT FOR TRACTORS.
APPLICATION FILED JUNE 1, 1920.

1,368,280.

Patented Feb. 15, 1921.
4 SHEETS—SHEET 1.

Inventor
Theodore A. Milutin
By S. E. Thomas
Attorney

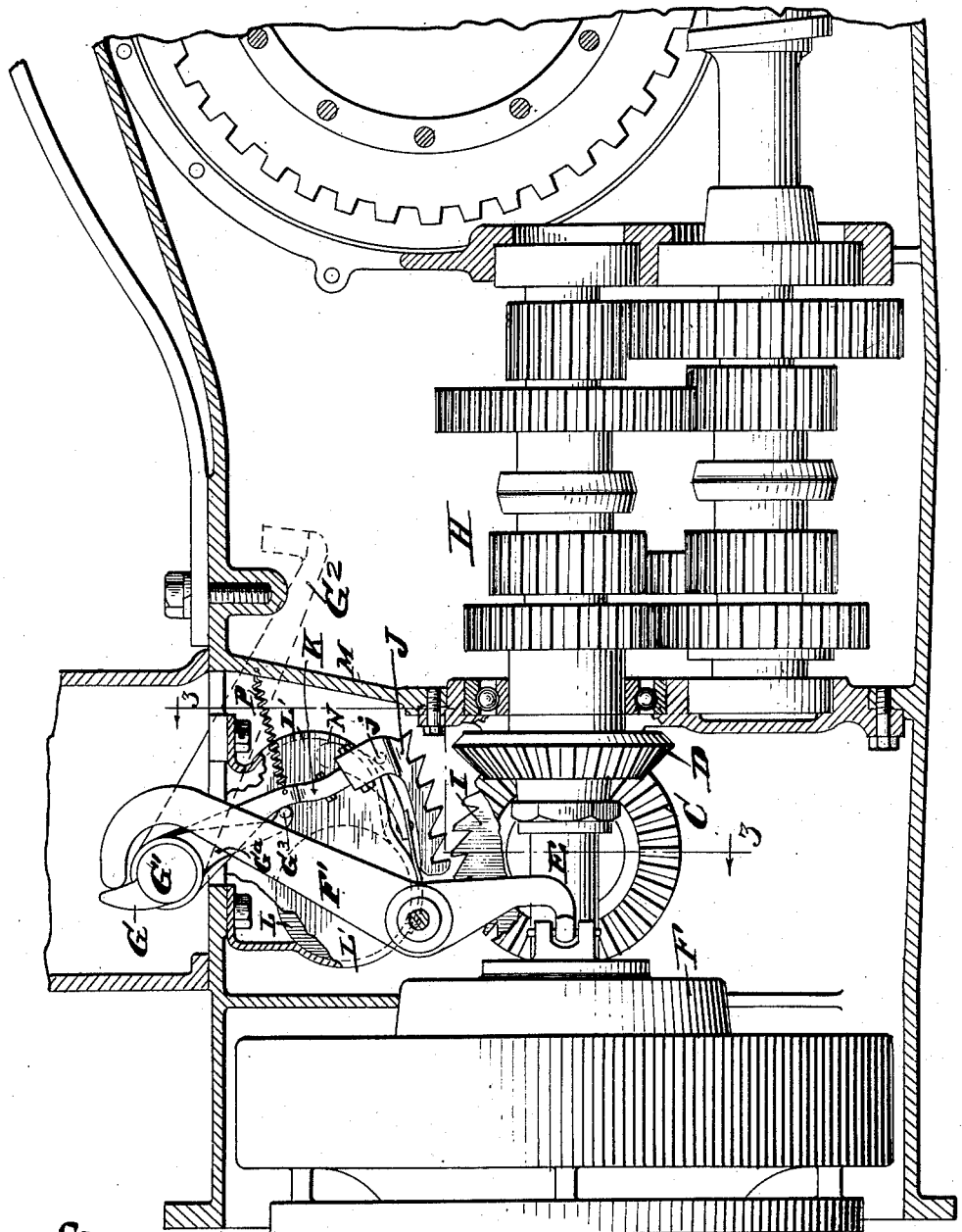

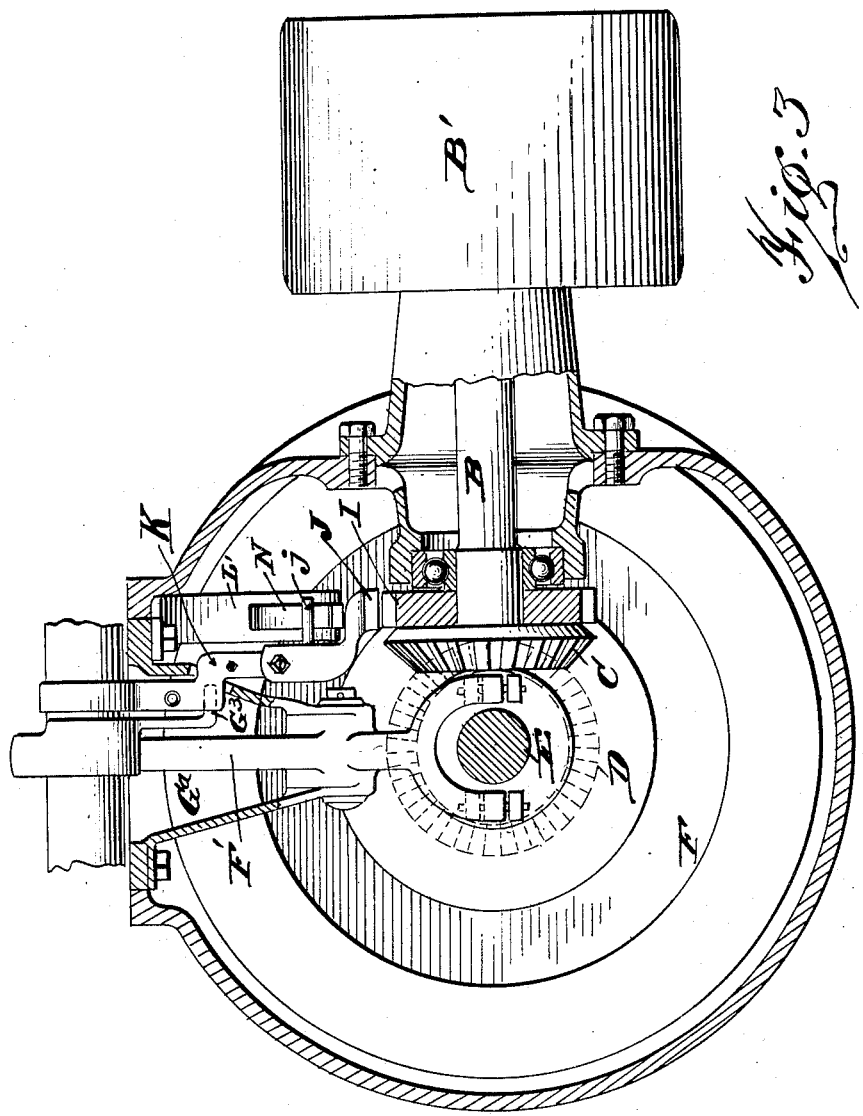

T. A. MILUTIN.
AUTOMATIC SAFETY ATTACHMENT FOR TRACTORS.
APPLICATION FILED JUNE 1, 1920.
1,368,280.
Patented Feb. 15, 1921.
4 SHEETS—SHEET 4.
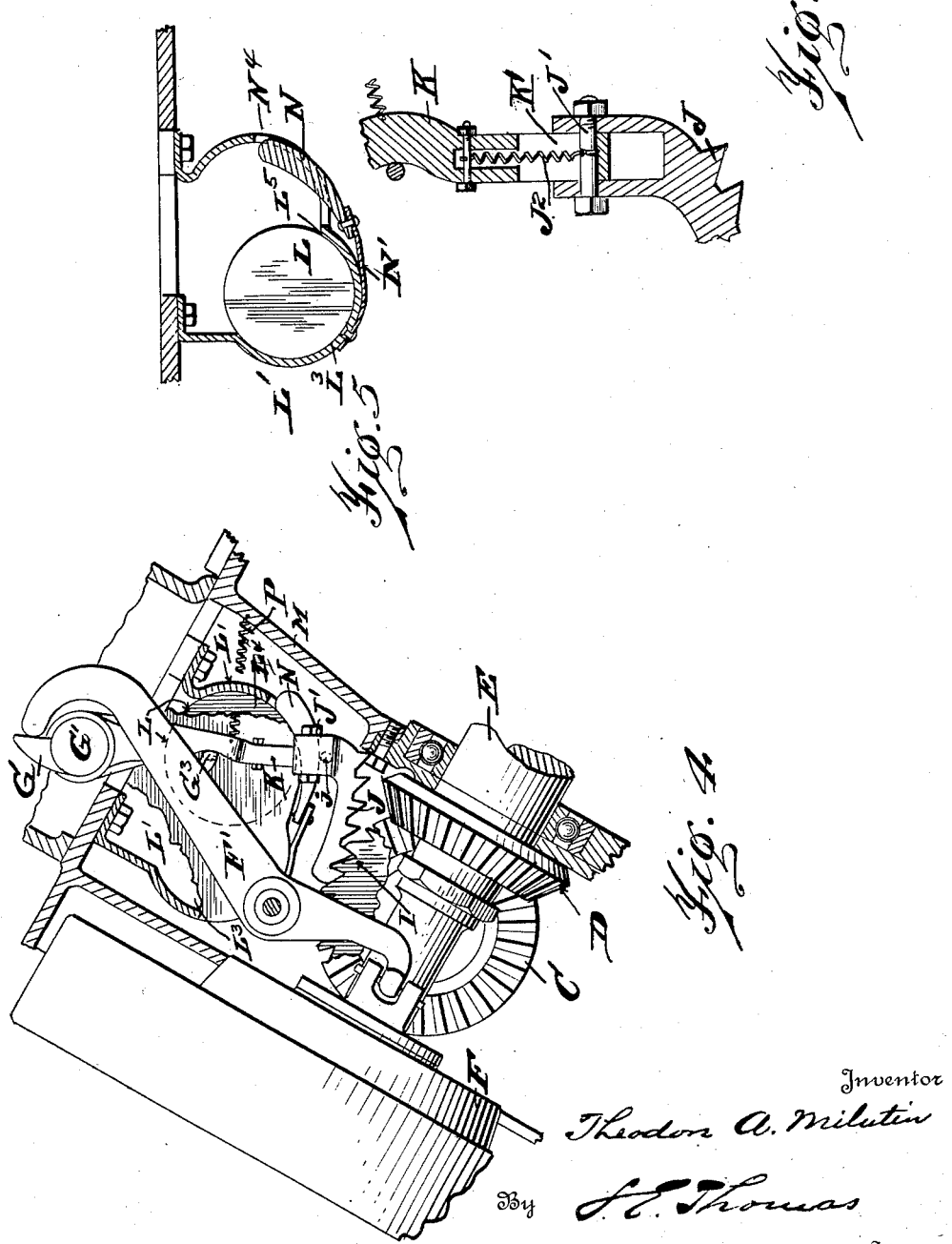

UNITED STATES PATENT OFFICE.

THEODORE A. MILUTIN, OF DEARBORN, MICHIGAN.

AUTOMATIC SAFETY ATTACHMENT FOR TRACTORS.

1,368,280.

Specification of Letters Patent.  Patented Feb. 15, 1921.

Application filed June 1, 1920. Serial No. 385,635.

*To all whom it may concern:*

Be it known that I, THEODORE A. MILUTIN, citizen of Russia, residing at Dearborn, county of Wayne, State of Michigan, have invented a certain new and useful Improvement in Automatic Safety Attachments for Tractors, and declare the following to be a full, clear, and exact description of the same, such as will enable others skilled in the art to which it pertains to make and use the same, reference being had to the accompanying drawings, which form a part of this specification.

My invention relates to an automatic safety attachment for tractors, its object being to prevent a tractor from overturning as a result of a sudden stoppage due to meeting an obstruction while the engine is operating to drive the tractor.

Many casualties occur in operating tractors through the sudden stoppage of the machine while the power of the prime mover is being applied to drive the tractor,—there being a tendency for it to tilt upwardly upon its rear axle until attaining a certain degree of angularity, it suddenly overturns,—crushing the operator beneath its weight.

The present invention is designed as a modification of two former inventions described in the applications filed by me on the 6th and 16th days of April, 1920, and respectively bearing Serial Numbers 371,658 and 374,308. One of the objects of the present invention is to provide a more simple and inexpensive construction with a more positive action of the clutch releasing means.

The invention consists also in an improvement in the general construction, arrangement, and combination of parts hereafter more fully described and claimed, it being understood that changes may be made in the precise embodiment herein disclosed without departing from the spirit of the same.

In the accompanying drawings forming part of this specification:—

Fig. 2 is a side elevation of a transmission and clutch assembly,—with its inclosing case in section,—showing on a larger scale the means for automatically releasing the clutch mechanism.

Fig. 3 is a cross-sectional view taken on or about line 3—3 of Fig. 2, showing a ratchet gear on the power take-off shaft, which acting in conjunction with coöperating parts serves to automatically release the driving clutch upon the tractor tilting to a predetermined degree.

Fig. 4 is a fragmentary elevation of the parts as indicated in Fig. 2, showing the ratchet gear operating to release the driving clutch as it would appear when the tractor is tilted to a certain predetermined degree of angularity.

Fig. 5 is a sectional view of a detail, showing the movable weight, inclosed in its supporting case, as it would appear in its normal position.

Fig. 6 is a fragmentary sectional view, showing the relatively adjustable connection between the ratchet bar and its supporting arm.

Figure 1:
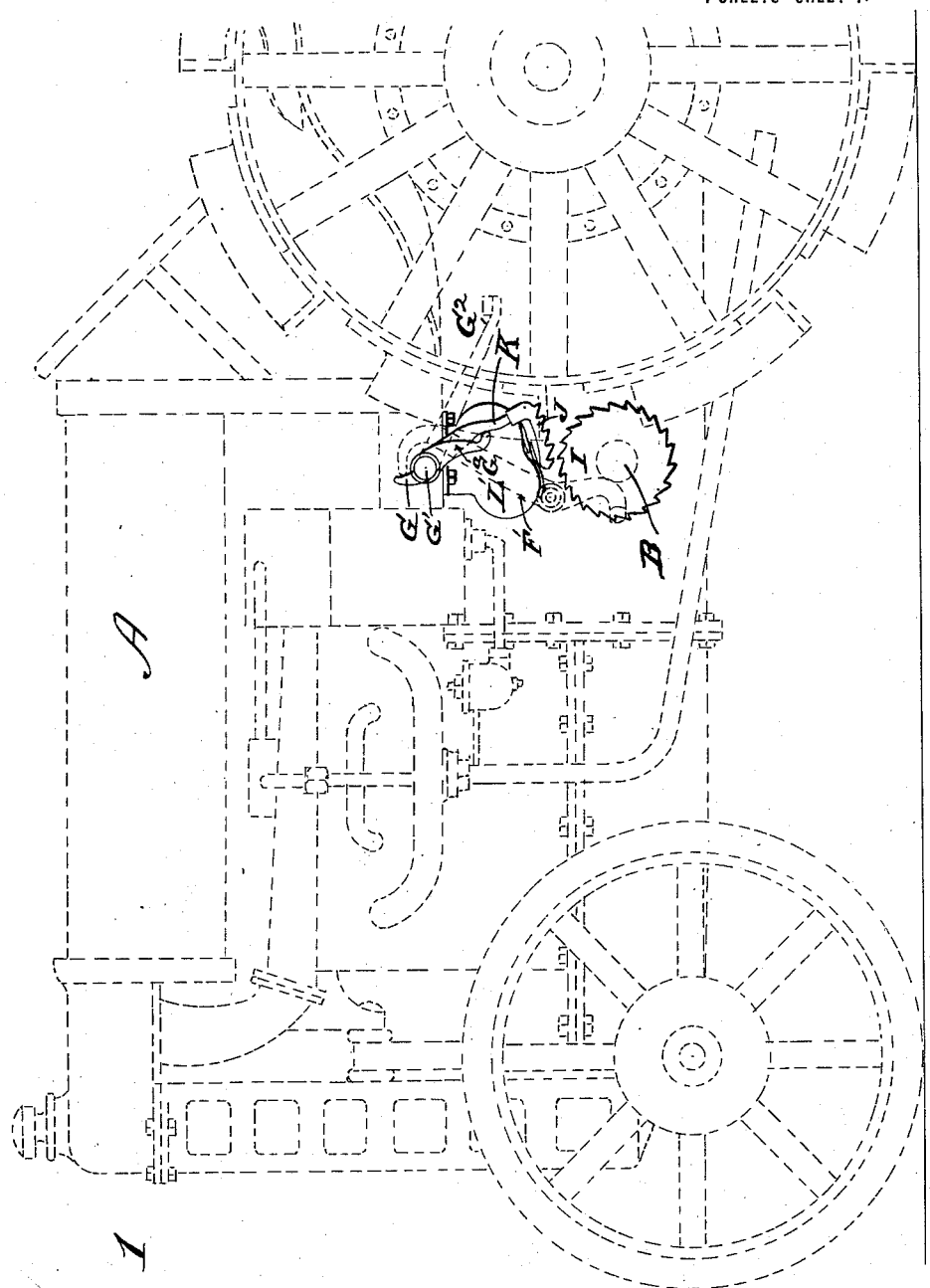
Figure 1 is a side elevation,—in dotted lines—of a portion of a tractor, with my invention installed thereon.

Referring now to the letters of reference placed upon the drawings:—

A, denotes a tractor; B its power take-off shaft actuated by the bevel gear C in mesh with a like gear D on the drive shaft E.

B' is the usual driving pulley on the power take-off shaft.

F, indicates the driving clutch and F' the clutch lever.

G, is a rocking arm on the shaft G' for operating the clutch lever F', and $G^2$ is a clutch pedal for actuating the clutch arm.

H, indicates the usual transmission gearing.

I, denotes a ratchet gear keyed to the power take-off shaft B. J, denotes an arc-shaped ratchet bar, sleeved upon the end of an arm K, projecting from the shaft G'. J', is a bolt bridging the socket in the upper end of the ratchet bar, and extending through a slotted opening in the end K' of the arm K. $J^2$ is a spring attached at one end to the bolt J' and at its opposite end to a bolt secured to the arm K, the spring serving to lift and normally maintain the ratchet bar J in released relation to the ratchet gear I. L, indicates a movable weighted element housed in a chamber L' bolted to the clutch and transmission housing M.

The chamber L' is slotted on its underside to admit the free end of a movable arm N, secured to the end of a spring N' which is in turn bolted to the wall of the casing. The spring N' yieldingly maintains the arm N normally projected through the slotted opening into the chamber L' to receive the impact of the weighted element L, when the latter is automatically shifted from its normal position in the pocket L³ to the pocket L⁴, by the tilting of the tractor. The pockets L³ and L⁴ are separated in the chamber by a ridge L⁵, over which the element L travels in passing from one pocket to the other. In order that the arc-shaped ratchet bar J may be yieldingly maintained upon the arm N in a proper coöperative relation to the ratchet gear L,—a spring P is provided connected at one end with the arm K and at the other end with the housing M or other suitable support.

The arc-shaped ratchet bar J, is also fitted with a pin j, (see Fig. 3) designed to receive the downward thrust of the spring supported arm N, when the latter is depressed through the shifting of the weighted element L from the pocket L³, (its normal position) to the pocket L⁴,—upon an abnormal tilting of the tractor. The ratchet bar J thereupon automatically engages the ratchet gear I, which due to its rotation, forces the arm K to bear upon a pin G³, projecting laterally from a downward extension G², of the rocker arm G. The shaft G' is thus rocked, thereby causing the arm G to bear against the end of the clutch lever to release the clutch which thus overcomes any tendency of the tractor to "overturn."

The tilted end of the tractor will now descend to the ground, upon the operator moving the usual gear shift lever to "neutral," whereupon the tractor wheels may be released from the obstruction which served to prevent their rotation.

Having thus described my invention, what I claim is:—

1. In a tractor, the combination of a power take-off shaft, a driving clutch, means for releasing the driving clutch, means carried by the power take-off shaft for operating said releasing means, and means actuated through an abnormal tilting of the tractor adapted to couple the clutch releasing means with the operating means carried by the power take-off shaft, whereby the driving clutch may be automatically released.

2. In a tractor, a driving clutch, a clutch releasing lever, a power take-off shaft, a ratchet gear mounted on the power take-off shaft, a rocking arm adapted to operate the clutch lever, a ratchet bar adapted to telescope upon the rocking arm, a chamber, a movable element lodged within said chamber, adapted to shift its position therein upon an abnormal tilting of the tractor, and a resilient arm normally projecting into said chamber and adapted to be forced by the movable element to bear upon the ratchet bar, whereby the latter may be brought into meshed relation with the ratchet gear to release the driving clutch.

3. In a tractor, a driving clutch, a clutch releasing lever, a power take-off shaft, a ratchet gear mounted on the power take-off shaft, a rocking arm, adapted to operate the clutch lever, a ratchet bar, adapted to telescope upon the end of the rocking arm, a spring connecting the ratchet bar with the rocking bar, a spring adapted to maintain said ratchet bar in position to coöperate with the ratchet gear, a chamber housing a movable element adapted to shift its position therein upon an abnormal tilting of the tractor, and an arm normally projecting into said chamber adapted to be forced by the movable element to bear upon the ratchet bar, whereby the latter may engage the ratchet gear.

In testimony whereof I sign this specification in the presence of two witnesses.

THEODORE A. MILUTIN.

Witnesses:
S. E. THOMAS,
JOHN CONSIDINE, Jr.